(No Model.)

J. G. FORSTBURG & P. BURKLAND.
AMMONIA EXPANSION VALVE.

No. 506,991. Patented Oct. 17, 1893.

Witnesses:
Saml. D. Stauffer
Howard B. Stauffer

Inventors
John G. Forstburg
Peter Burkland
By Danl. H. Herr
Atty.

UNITED STATES PATENT OFFICE.

JOHN G. FORSTBURG AND PETER BURKLAND, OF LANCASTER, PENNSYLVANIA.

AMMONIA-EXPANSION VALVE.

SPECIFICATION forming part of Letters Patent No. 506,991, dated October 17, 1893.

Application filed March 5, 1891. Serial No. 383,925. (No model.)

*To all whom it may concern:*

Be it known that we, JOHN G. FORSTBURG and PETER BURKLAND, of Lancaster, in the county of Lancaster and State of Pennsylvania, have invented certain new and useful Improvements in Ammonia-Expansion Valves; and we do hereby declare the following to be a full, clear, and exact description of the invention, such as will enable others skilled in the art to which it appertains to make and use the same.

Our invention relates to improvements in an ammonia expansion valve to be used in connection with refrigerating or ice making appliances and is of that class in which a conical valve being the frustum of a right cone is fitted into a tapering socket valve seat by means of a ground joint; the valve is provided with means for packing and ready cleaning; is operated by a hand wheel, and has a notched disk and a pointer to indicate any degree of valve opening.

The objects of the invention are: the production of a valve that is simple in construction, readily applied and easily operated; that may be conveniently packed with any suitable packing entirely removed from all contact with the flow of ammonia; that all foreign substances or scales may be removed therefrom with no loss of ammonia; and, in which the expansion of ammonia may be positively controlled or regulated to a degree of nicety or accuracy and with a convenience heretofore unknown. Heretofore valves for this purpose were of that class known to the trade as gate-valves, but having objections which in our invention are reduced to a minimum if not entirely removed.

The purposes of the invention are attained by the mechanism and devices illustrated in the several views of the accompanying drawings in which similar letters refer to similar parts throughout.

Figures 1, 2:
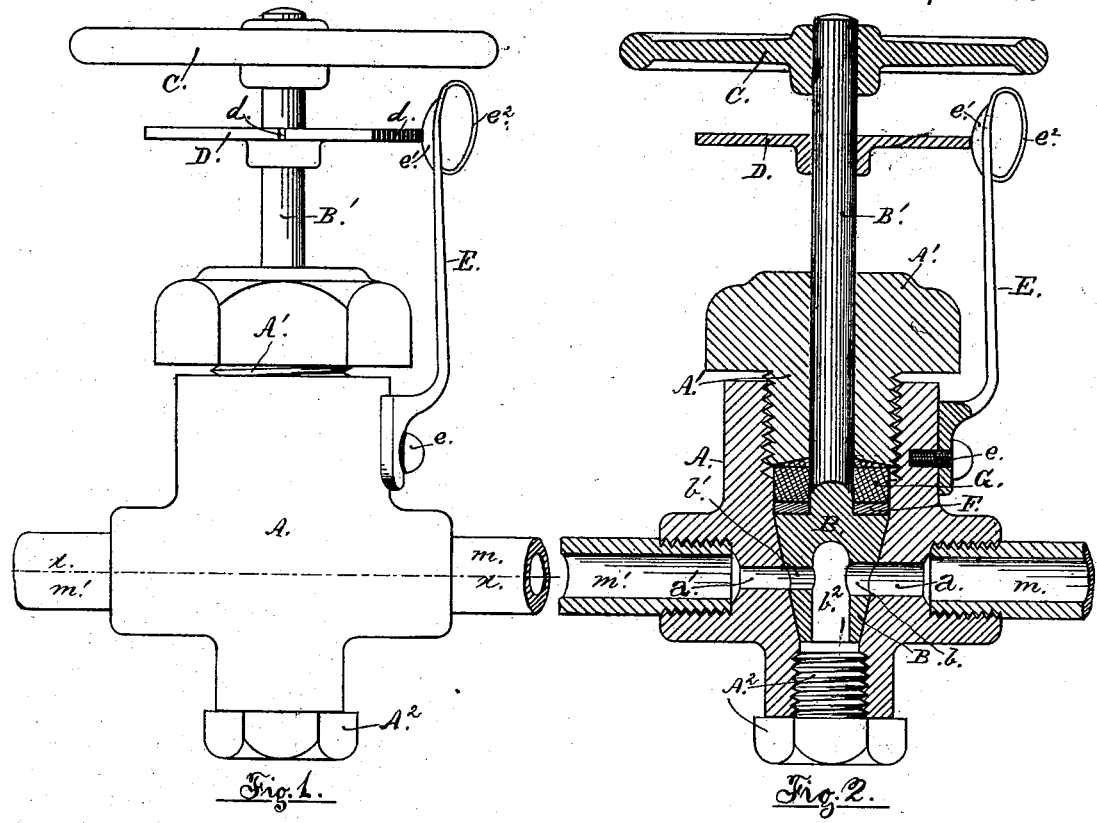
Figures 3, 4:
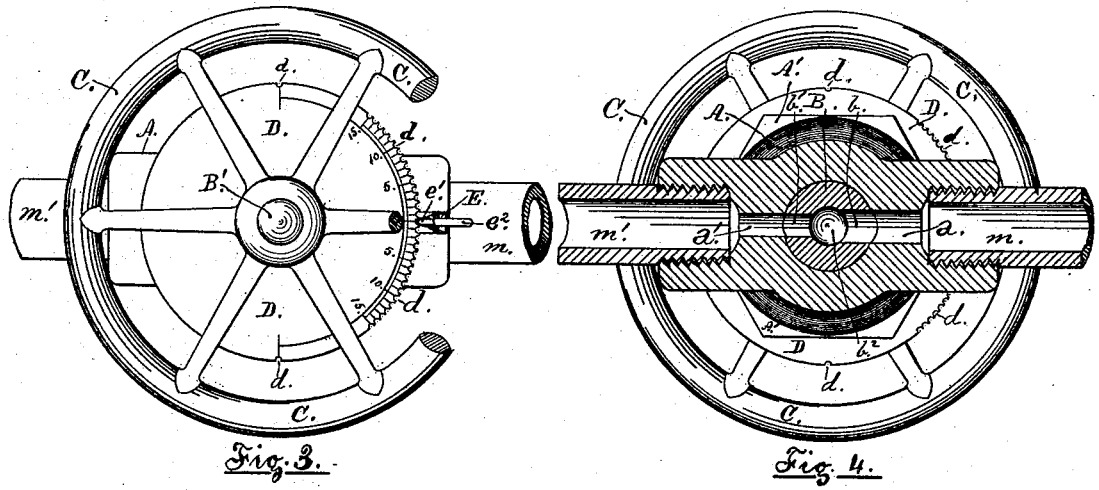

Figure 1 is a front elevation of an ammonia expansion valve embodying the elements of our invention, the valve in place between portions of the inlet and outlet pipes; Fig. 2, a vertical section through the longitudinal central plane, the plug screw, the upper portion of the valve shaft and the pointer shown full; Fig. 3, a top view of Fig. 1, a portion of the hand wheel removed to show the pointer blade in engagement with the notched or indicating disk; and Fig. 4, a sectional view from below of the portion above the horizontal plane through the line $xx$ in Fig. 1.

The valve seat is conical in form and is located vertically at the center of the body A which is cruciform in shape, having horizontally through it about the axis of the cross arms orifices $a$ and $a'$ which are greatly enlarged in the outer portions of said cross arms, screw threaded on the inside and adapted to receive respectively the threaded ends of the inlet and outlet pipes $m$ and $m'$, the orifice $a$ on the inlet side being of considerably greater diameter than the orifice $a'$ on the outlet side; while above the valve seat is a stuffing or packing box, screw threaded on the inside and adapted to be closed by a packing or gland screw $A'$ having an angular head, and below the valve seat is a refuse receiving chamber screw threaded on the inside and adapted to be closed by a plug screw $A^2$ also having an angular head. Into this valve seat is closely fitted a conical valve-plug B being the frustum of a right cone having its base above, and its outer convex slant surface ground jointed with the inner concave conical surface of the seat to prevent leakage, while the valve has horizontally through its body orifices $b$ and $b'$ opening into a chamber $b^2$ formed at the center of the valve and extends vertically along its axis through the bottom into the receiving chamber before mentioned, the orifice $b$ to register with the orifice $a$, and the orifice $b'$ with the orifice $a'$, both in the valve seat and before mentioned; at the center of the top and integral with the body of the valve is a stem $B'$ extending vertically upward through the center of the packing screw $A'$ as shown to a convenient point above where its upper end is provided with a hand-wheel C to operate the valve. Below the hand-wheel and having its center secured to the stem is an indicating disk D having in the edge of its periphery a number of equidistant notches $d$, marked and numbered on the upper face of the disk, whereby the degree of the valve opening is always shown.

E represents a pointer attached to the body of the valve seat by a screw $e$ and the pointer is provided near its upper end with a blade $e'$ adapted to engage the notches in the disk and to rest in the one required, and a loop $e^2$ whereby the blade may be withdrawn from the engaged notch.

The disk D may be dispensed with and the notches and scale placed on and in the rim of the hand-wheel, but in that case the arm of the pointer will have to be lengthened and somewhat differently formed.

In the stuffing box and on top of the valve is a washer F to keep the packing substance from all contact with the body of the valve. On the washer is placed the body of the packing G which may be of any suitable material and it may be compressed to the required extent by means of the packing screw $A'$. This packing substance may be dispensed with and a coiled spring used instead, a construction so evident that its illustration is deemed unnecessary.

In the several views of the drawings the valve is shown open to its full extent for the admission of ammonia and that the blade of the pointer is in engagement with the indicating notch marked O under the cut away end of the hand-wheel spoke. Turning the hand-wheel in either direction from this position it is evident that said valve opening will be gradually closed and indicated as the pointer blade engages the successive notches; and when said blade engages the notch at either extreme of the scale on the disk, the valve will be completely closed and the inflow of ammonia cut off, the orifices through the valve making angles at the center of ninety degrees with the orifices in the seat. The outlet orifice $b'$ being very small as compared with the orifice $b$, should there be any foreign substances in the liquid ammonia admitted such substances will drop through the opening $b^2$ into the retaining chamber below, and should scales form within said opening $b^2$ and clog the orifices in the valve, the valve may be readily closed by turning the hand-wheel, the chamber opened by unscrewing the plug $A^2$, and the obstructions removed without any loss of ammonia. The valve being ground jointed in its seat there can be no leakage and no contact of ammonia with the valve packing, and consequently no scaling to clog the packing or to interfere with the proper action of the valve as was heretofore so detrimental to such packing and to the proper working of the valves in use. And the valve being so completely under control by means of the hand-wheel, the notches and graduated scale on the disk and the pointer as described, the inflow of ammonia may be regulated and used expansively to a degree of nicety and with a convenience heretofore unknown.

Having now described our invention and fully set forth its application, what we do consider new, and desire to secure by Letters Patent, is—

1. In an ammonia expansion valve the conical valve plug ground jointed in the tapering valve seat, and having an axial opening $b^2$, from a point above the center through the bottom of the plug, the horizontal inlet and outlet orifices $b$, $b'$, communicating with said opening through the sides of the plug, the orifice $b'$, being of smaller diameter than the corresponding orifice $b$, the orifices $a$, $a'$ in the valve seat to register with the orifices of the plug, an upwardly extending vertical stem $B'$, integral with the plug, the hand wheel for operating the said plug, an indicating disk D secured to the stem $B'$, having graduated notches $d$, in the edge, and a pointer E the lower end of which is secured to the body of the valve seat, and the upper end provided with a blade $e'$, to engage the peripheral notches in the disk D, and the hand loop to disengage the blade from said notches, substantially as described.

2. The combination in an ammonia expansion valve, with the cruciform body A having a tapering socket valve seat at the center, a stuffing box closed by a packing screw $A'$ above the valve seat, a refuse receiving chamber closed by a plug screw $A^2$ below the valve seat, an inlet orifice $a$ to the valve seat about the axis of one of the cross arms and an outlet orifice $a'$ from the valve seat about the axis of the other cross arm, the orifice $a$ having a greater diameter than the orifice $a'$ but both orifices enlarged and screw threaded within the outer portions of the cross arms to receive the ends of the respective inlet and outlet pipes $m$ and $m'$, of a conical valve plug B ground jointed in said valve seat, the valve plug having the horizontal orifice $b$ to register with the orifice $a$ of the seat and the orifice $b'$ to register with the orifice $a'$ of the seat, the central vertical chamber $b^2$ extending through the bottom of the valve plug into which chamber and near its upper end both of said orifices $b$ and $b'$ open, and the stem $B'$ its lower end integral with the valve plug at the center of its top; the washer F on top of the valve plug, and the packing G between the washer and the screw $A'$ to keep the valve in place; the hand wheel secured to the stem to turn the valve plug and the indicating disk and pointer by which the degree of valve opening is shown, substantially as described.

In testimony whereof we have hereunto subscribed our names in the presence of two subscribing witnesses.

JOHN G. FORSTBURG.
PETER BURKLAND.

Witnesses:
JOHN BAKER,
DANL. H. HERR.